US008474824B2

(12) United States Patent
Dell'Eva et al.

(10) Patent No.: US 8,474,824 B2
(45) Date of Patent: Jul. 2, 2013

(54) PRESSURE SENSING MODULE HAVING AN INTEGRATED SEAL PLATE AND METHOD OF ASSEMBLING PRESSURE SENSING MODULE

(75) Inventors: Mark Louis Dell'Eva, Grand Blanc, MI (US); Robert John Kanda, Lake Orion, MI (US); Eugene Francis Moody, Waterford, MI (US)

(73) Assignee: Eaton Corporation, Cleveland, OH (US)

( * ) Notice: Subject to any disclaimer, the term of this patent is extended or adjusted under 35 U.S.C. 154(b) by 1269 days.

(21) Appl. No.: 12/267,889

(22) Filed: Nov. 10, 2008

(65) Prior Publication Data

US 2010/0117308 A1    May 13, 2010

(51) Int. Cl.
*F16J 3/00* (2006.01)
*F16L 21/05* (2006.01)
*F16L 17/06* (2006.01)

(52) U.S. Cl.
USPC ............................ 277/317; 277/603; 277/608

(58) Field of Classification Search
CPC ........ F16J 15/326; F16J 15/406; F16J 15/0887
USPC .......................... 277/317, 318, 603, 608, 624
See application file for complete search history.

(56) References Cited

U.S. PATENT DOCUMENTS

| 4,474,889 | A  | * | 10/1984 | Terry et al. .................... 436/161 |
| 5,964,239 | A  | * | 10/1999 | Loux et al. ................. 137/15.21 |
| 6,698,798 | B2 | * | 3/2004  | Tai et al. ..................... 285/124.1 |
| 6,907,789 | B2 | * | 6/2005  | Bodin ............................. 73/753 |
| 2002/0023765 | A1 | * | 2/2002 | Sugiura et al. ............... 174/52.2 |
| 2002/0093143 | A1 | * | 7/2002 | Tai et al. ......................... 277/603 |
| 2007/0277754 | A1 | | 12/2007 | Dell'Eva et al. |

FOREIGN PATENT DOCUMENTS

| EP | 0553725 A2 | 8/1993 |
| JP | 2007142248 A | 6/2007 |

* cited by examiner

*Primary Examiner* — Vishal Patel
*Assistant Examiner* — Nathan Cumar
(74) *Attorney, Agent, or Firm* — Quinn Law Group, PLLC

(57) ABSTRACT

A method of assembling a pressure sensing module includes affixing a pressure sensor unit to an alignment tool and indexing the alignment tool to a circuit board. After the pressure sensor unit is attached to the circuit board, a seal plate is indexed thereto. A locator feature indexes receptacle elements on the circuit board, alignment tool, and seal plate. An integrated seal module includes a mounting plate having first and second opposing faces, and at least one locator hole and one or more pressure passages extending therethrough. A unitary seal member effects a fluid seal between the pressure ports and the first face and the pressure sources and the second face. A seal member and locator bushings may be formed as a single, continuous liquid injection molded framework, including portions encased by the mounting plate. Pressure passages provide fluid to pressure sensors, which may be overmolded in the mounting plate.

17 Claims, 3 Drawing Sheets

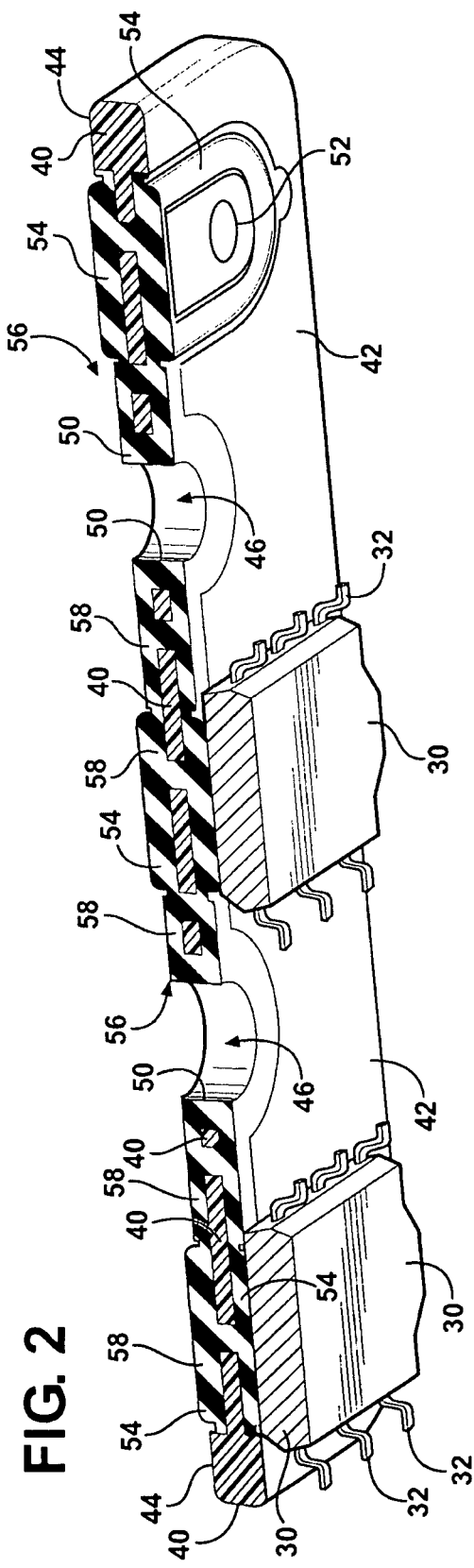
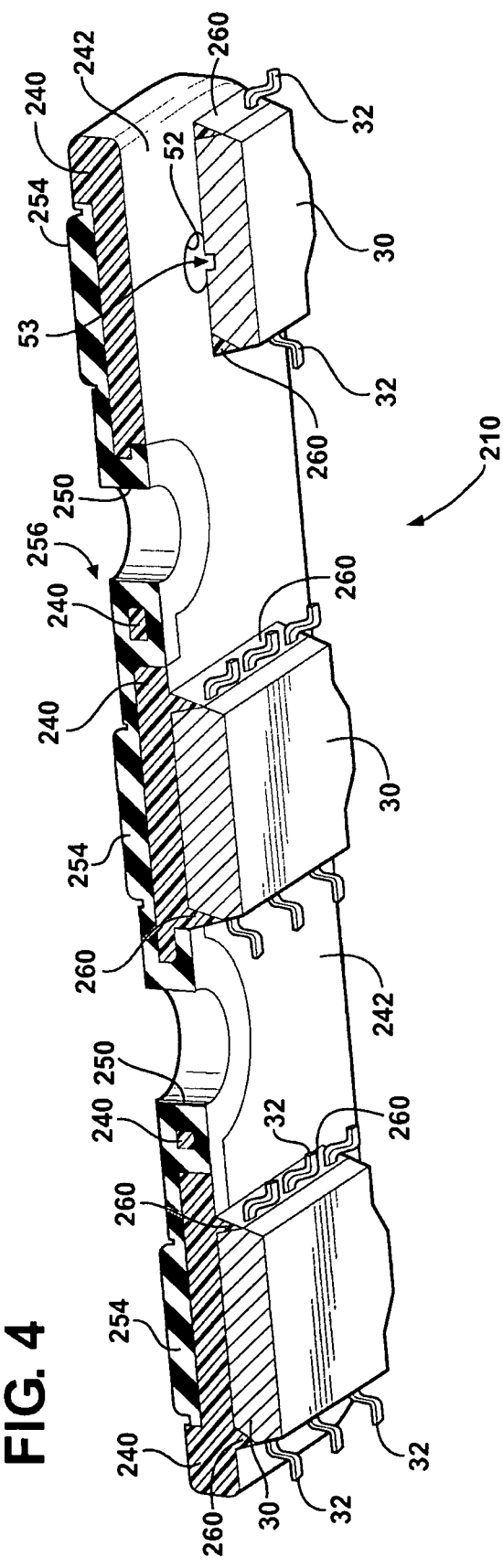
FIG. 2
FIG. 4

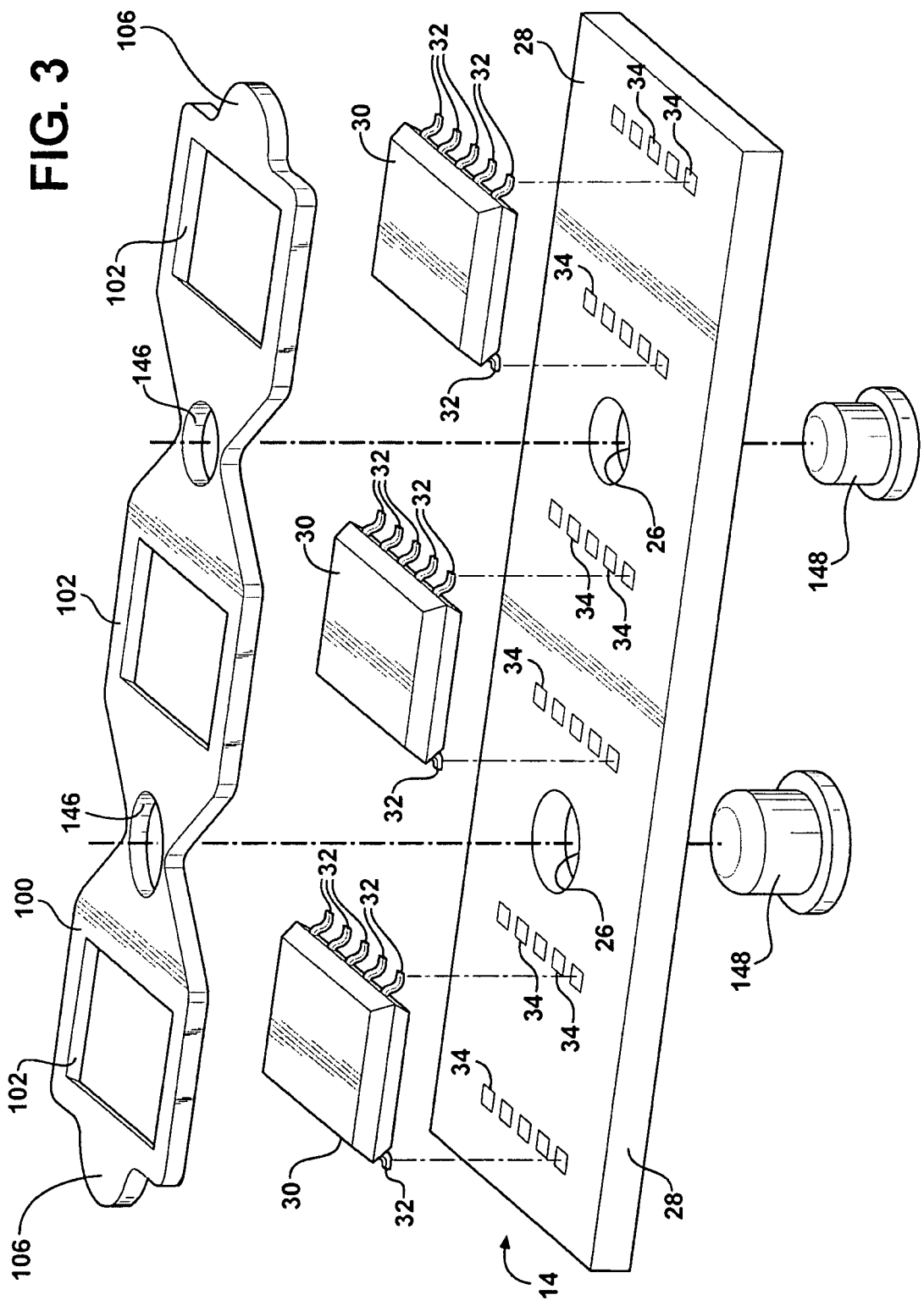

PRESSURE SENSING MODULE HAVING AN INTEGRATED SEAL PLATE AND METHOD OF ASSEMBLING PRESSURE SENSING MODULE

TECHNICAL FIELD

This disclosure relates to a pressure sensing module for sensing the pressure of fluid pressure sources.

BACKGROUND OF THE INVENTION

Transmission systems are one example of common hydraulic fluid applications. Fluid pressure (of a liquid or gas) is one element that is monitored to measure performance and to operate such systems.

In an automotive automatic transmission system, for example, electronic controls are commonly used to control the pressure of the hydraulic fluid within the fluid lines. By varying the pressure of the hydraulic fluid in the lines, various elements of the automatic transmission system, including the engagement of individual clutches, may be controlled. For example, by varying the pressure of the hydraulic fluid in the fluid lines, the shift points of the gears may be controlled.

SUMMARY

A method of assembling a pressure sensing module includes placing a pressure sensor unit on an alignment tool and indexing the alignment tool to a circuit board. The pressure sensor unit may be attached to the circuit board and the alignment tool removed from the pressure sensor unit. A seal plate is indexed to the circuit board and the pressure sensor to form a fluid seal between the pressure sensor unit and seal plate.

An integrated seal module for sealing one or more pressure ports to one or more pressure sources is further provided. The seal module includes a mounting plate having a first surface and a second surface on opposing sides thereof, and at least one locator hole defined by the mounting plate and extending through the mounting plate between the first and second surfaces. One or more pressure passages are defined by the mounting plate and extend therethrough between the first and second surfaces. A unitary seal member is configured to effect a fluid seal between the one or more pressure ports and the first face, and configured to effect a fluid seal between the one or more pressure sources and the second face.

The above features and advantages and other features and advantages of the present invention are readily apparent from the following detailed description of the best modes and other embodiments for carrying out the invention when taken in connection with the accompanying drawings.

BRIEF DESCRIPTION OF THE DRAWINGS

FIG. 2 is a schematic, cross-sectional, perspective view of the integrated seal module and pressure sensors shown in FIG. 1, shown with one pressure sensor removed for illustrative purposes;

FIG. 3 is a schematic, perspective, exploded view of an alignment tool or fixture and a sensor array which may be used to assemble a pressure sensing module such as that shown in FIG. 1; and FIG. 4 is a schematic, cross-sectional, perspective view of an overmolded integrated seal module, shown with a portion of one pressure sensor and associated overmolding removed for illustrative purposes.

DESCRIPTION OF PREFERRED EMBODIMENTS

Figure 1:
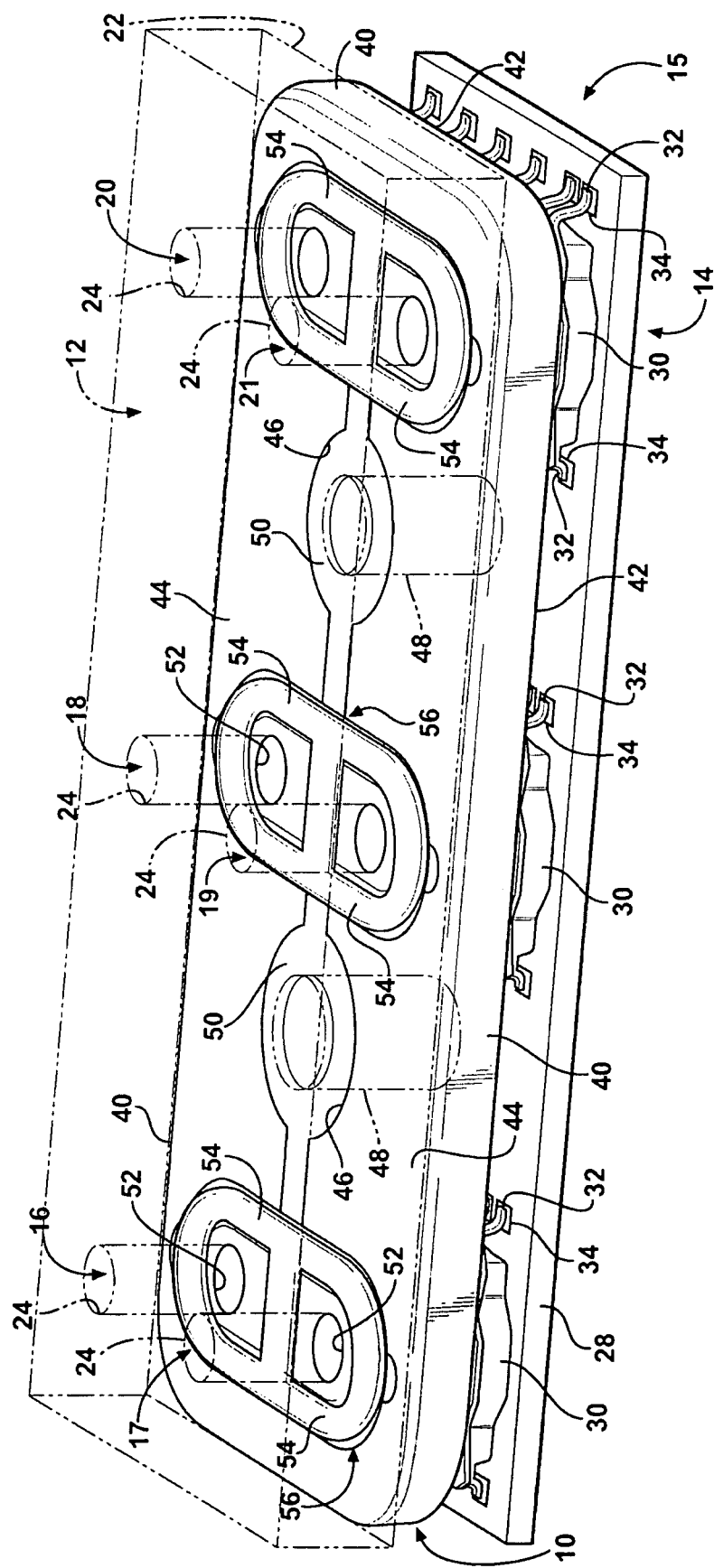
FIG. 1 is a schematic perspective view of an integrated seal module incorporated into a pressure sensing module shown against a valve or manifold (shown in phantom) having pressure sources therein.

Referring to the drawings, wherein like reference numbers correspond to like or similar components throughout the several figures, there is shown in FIG. 1 an exemplary embodiment of an integrated seal module 10 for sealing a valve body or manifold 12 (shown in phantom) to a sensor array 14. For illustrative purposes, the manifold 12 is shown in phantom to better view the integrated seal module 10. Those having ordinary skill in the art will recognize that terms such as "above," "below," "upward," "downward," et cetera, are used descriptively of the figures, and do not represent limitations on the scope of the invention, as defined by the appended claims.

Manifold 12 is shown only partially in FIG. 1, and may be part of transmission, brake, or other automotive systems. Alternatively, manifold 12 may be part of non-automotive systems, such as industrial and manufacturing systems having controlled or monitored fluid systems. The pressure in manifold 12 is monitored to assist in accurate and repeatable control of the fluid system. Sensor array 14 and integrated seal module 10 combine to form a pressure sensing module 15 that can accurately measure multiple sources of pressure from the manifold 12.

In the embodiment shown in FIG. 1, there are six pressure sources 16, 17, 18, 19, 20, and 21, each communicating with a manifold face 22 via one respective line 24. Each pressure source 16-21 may be separately monitored by measuring the pressure in a respective one of the lines 24. The manifold 12 shown in FIG. 1 has the lines 24 arranged in three pairs, corresponding to pairs of pressure sources 16, 17; 18, 19; and 20, 21. Those having ordinary skill in the art will recognize that the number, configuration, and spacing of pressure sources 16-21 and lines 24 need not be limited to the embodiment shown in FIG. 1.

The sensor array 14 includes a circuit board 28 having three sensors 30 mounted thereon. In the embodiment shown, each of the three sensors 30 is a small outline integrated circuit (SOIC). Those having ordinary skill in the art will recognize other sensors that may be arranged to measure pressure in the lines 24, and will further recognize fewer or additional sensors 30 may be utilized within the scope of the appended claims.

Sensors 30 communicate electronically with the circuit board 28 via pins 32, which carry signals indicative of the pressure measured by the sensors 30 (as described in more detail below). Pins 32 contact terminals 34 on the circuit board 28, and may be connected by a soldering process. The solder medium (not shown) acts both to bind the pins 32 to respective terminals 34 and to facilitate electrical communication therebetween.

Circuit board 28 further includes one or more alignment holes 26 (blocked from view by mounting plate 40 in FIG. 1, shown in FIG. 3), which are located in fixed positions on the circuit board 28. The alignment holes 26 therefore provide an indexing feature allowing the features of the circuit board 28—such as the terminals 34—to be located relative to the alignment holes 26.

The integrated seal module 10 is disposed generally between the manifold 12 and sensory array 14, and includes a seal plate or mounting plate 40. On opposing faces of the mounting plate 40 are a first surface 42 and a second surface 44. In the embodiment shown in FIG. 1, the first surface 42 faces the sensor array 14 and the second surface 44 faces the manifold 12.

Integrated seal module 10 further includes one or more locator holes 46 connecting and extending between the first and second surfaces 42 and 44. Locator holes 46 act as indexing receptacles, which are configured to locate, key, or align the integrated seal module 10 relative to the sensor array 14.

One or more indexing posts 48 may be affixed to, or formed as part of, the manifold 12, thereby providing fixed reference features from the manifold 12 for the sensor array 14 and seal module 10. Indexing posts 48 are shown in phantom in FIG. 1, and are configured to extend through the seal module 10 and the circuit board 28. The indexing posts 48 act as indexing features and interact with the locator holes 46 (indexing receptacles) to index the integrated seal module 10 relative to the manifold 12.

Indexing posts 48 are further configured to interact with the alignment holes 26 of the circuit board 28. Therefore, by indexing the locator holes 46 to the indexing posts 48, and by indexing the alignment holes 26 to the indexing posts 48; the integrated seal module 10, circuit board 28, and manifold 12 may all be located and aligned with predetermined respective spatial relationships. The alignment holes 26 and locator holes 46 are shaped to closely match the profile of the indexing posts 48.

Optionally, as shown in FIG. 1, the each of the alignment holes 26 and locator holes 46 may be shaped differently to key the mating of the integrated seal module 10 with the manifold 12 and the sensor array 14. Those having ordinary skill in the art will recognize other indexing features and elements which may be used to align and locate the integrated seal module 10 relative to the sensor array 14 and/or the integrated seal module 10 relative to the manifold 12.

The integrated seal module 10 includes one or more bushings 50 (two, in the embodiment shown in FIG. 1) disposed within the locator holes 46. Bushings 50 facilitate mating of the locator holes 46 to the indexing posts 48, such that the interior surfaces of the bushings 50 act as indexing receptacles. Furthermore, the bushings 50 compensate for slight misalignment of the locator holes 46 relative to the indexing posts 48 by providing a pliable or adaptable interface therebetween.

As shown in FIG. 1, six pressure passages 52 are defined by the mounting plate 40 and extend between the first and second surfaces 42 and 44. The pressure passages 52 are generally coaxial with the lines 24 at the manifold face 22, and are configured to provide fluid communication between the pressure sources 16-21 and pressure ports 53 on the sensors 30.

Depending upon the configuration of the sensor array 14 and the sensors 30, each of the sensors 30 may monitor and measure one or more of the pressure sources 16-21. In the embodiment shown in FIG. 1, there are three sensors 30, each measuring a pair of the pressure sources 16-21. Pressure ports 53 on the pressure sensors 30 (blocked from view in FIG. 1, shown in FIG. 4) measure the pressure of the pressure sources 16-21. The number of pressure ports 53 on each pressure sensor 30 determines the number of individual pressure sources which can be measured by each pressure sensor 30 and, therefore, by the sensor array 14. Each pressure sensor 30 may have one or more pressure ports 53.

To prevent leakage of fluids and subsequent false readings of the pressure in pressure sources 16-21, the integrated seal module 10 includes sealing elements 54 at each of the interfaces between the lines 24, pressure passages 52, and the pressure ports 53 on sensors 30. In the embodiment shown in FIG. 1, there are six sealing elements 54 on each of the first and second surfaces 42 and 44. All twelve of the sealing elements 54 and both of the bushings 50 are formed together as a continuous, unitary seal member 56.

The circuit board 28, or some other element of the sensor array 14, may be configured to receive mounting hardware (not shown) which attaches the sensor array 14 and the integrated seal module 10 to the manifold 12. The mounting hardware also provides force to compress the sealing elements 54 between the sensors 30 and the first surface 42 of the integrated seal module 10 and between the manifold 12 and the second surface 44.

In an alternative embodiment (not shown), the indexing posts 48 may be formed as separate elements from the manifold 12. In such an embodiment, the indexing posts 48 may be configured with integrated mounting hardware or features. Therefore, in addition to indexing the sensor array 14 to the integrated seal module 10 and the manifold 12, the indexing posts 48 would also attach or affix the sensor array 14 and integrated seal module 10 to the manifold 12.

Referring now to FIG. 1, and also to FIG. 2, which is an alternative view of the integrated seal module 10 shown in FIG. 1. FIG. 2 shows a cross-sectional view of the integrated seal module 10 and two of the pressure sensors 30. The third pressure sensor 30 has been removed from FIG. 2 to show one of the sealing elements 54 on the first surface 42.

Unitary seal member 56 includes sealing elements 54 on both sides of mounting plate 40, and has connecting portions 58 which pass between the first and second surfaces 42 and 44. As shown in FIG. 2, the connecting portions 58 are completely surrounded and encased by the material of mounting plate 40.

The unitary seal member 56 may be formed from liquid injection molded (LIM) silicon or another suitable material. The LIM silicon is molded into preformed channels and grooves in the mounting plate 40, thereby forming the sealing elements 54, bushings 50, and connecting portions 58.

The unitary seal member 56 incorporates multiple sealing elements 54 and therefore replaces multiple seals, such as small o-rings. Removal of multiple seals reduces the difficulty, time, and cost of manufacturing the pressure sensing module 15. Furthermore, the unitary seal member 56 reduces the possibility of inter-seal leakage which may cause fluid flow between the lines 24 and result in mixing of the pressure sources 16-21.

Manufactured products are subject to variation. Tolerances limit the variation allowed for individual feature geometry, such as form and size, and limit the geometric relationship between features, such as orientation and location. The cumulative effects of the tolerances—known as "stackups"—may result in structures or assemblies that are unacceptable.

In general terms, pressure sensing devices need to provide both a robust seal and sufficient fluid communication between the pressure sources (such as 16-21) and the pressure measurement devices (such as the pressure ports 53). However, variance stackups may inhibit fluid communication between the pressure sources (16-21) and the pressure measurement locations (53) by offsetting the fluid channels (lines 24 and pressure passages 52).

As shown in FIGS. 1 and 2, to achieve a reasonably accurate pressure measurement from the pressure sensing module 15, the pressure ports 53 on the pressure sensors 30 need to fluidly communicate with the pressure sources 16-21. Accurate measurements require robust seals between the lines 24 and the pressure passages 52, and also require robust seals between the pressure passages 52 and the pressure sensors 30.

In the integrated seal module 10, incorporation of the sealing elements 54 on both the first and second surfaces 42 and 44 reduces the effects of the accumulated variations that occur due to manufacture and installation tolerances of separate seals. By reducing the number of parts used to seal the interfaces between the pressure sources 16-21 and the sensors 30, the tolerance stackups are similarly reduced.

Another embodiment of the integrated seal module 10 may include cradles or brackets (not shown). The cradles or brackets are configured to engage or lock onto the sensors 30, and may assist in aligning the pressure passages 52 with the pressure ports 53 on the sensors 30. For example, the cradles may be configured to lock onto the corners of the pressure sensors 30, which may assist in holding and aligning the pressure sensors 30 relative to the circuit board 28 prior to soldering the pins 32 to the terminals 34.

Referring now to FIG. 3, there is shown a perspective, exploded view of the sensor array 14 shown in FIG. 1, along with a frame or alignment tool 100. The alignment tool 100 may be used to decrease alignment errors during assembly of the pressure sensing module 15 shown in FIG. 1.

Alignment tool 100 contains structure configured to properly locate and align the pressure sensors 30 on the circuit board 28 of sensor array 14. In the embodiment shown in FIG. 3, up to three pressure sensors 30 may be temporarily affixed to, or placed in, corresponding brackets 102 on the alignment tool 100. The brackets 102 may be shaped with an outline generally matching that of the pressure sensors 30. Brackets 102 hold and properly locate the pressure sensors 30 relative to the circuit board 28 and relative to each other (where more than one pressure sensor 30 is used in the sensor array 14).

One or more locator holes 146 are defined by the alignment tool 100. Locator holes 146 are similar to the locator holes 46 on the integrated seal module 10 and index the alignment tool 100 relative to the circuit board 28. The locator holes 146 are configured to mate with one or more indexing posts 148, which are similar in configuration to indexing posts 48 (although shown coming from a different direction). Indexing posts 148 may be attachable to the circuit board 28, freestanding, or attached to an additional fixture or hard tooling. The indexing posts 148 are also configured to mate with the alignment holes 26 of circuit board 28.

In an alternative embodiment (not shown), the indexing posts 148 may be formed as an integral part of the alignment tool 100. Such an embodiment would eliminate the locator holes 146, as the indexing posts 148 would already be located relative to the alignment tool 100.

In the embodiment shown, the brackets 102 are tapered, which allows the brackets 102 to both vertically and horizontally align the pressure sensors 30 in the alignment tool 100. By affixing the pressure sensors 30 to the alignment tool 100 and sliding the locator holes 146 over the indexing posts 148, each of the pressure sensors 30 may be indexed and located relative to the circuit board 28.

In operation, the pressure sensors 30 may be affixed to the brackets 102 in one location of the manufacturing facility and then moved to the circuit board 28 at another location. Movement and rotation of the alignment tool 100 and pressure sensors 30 may be accomplished by grabbing a pair of tabs 106 on opposing ends of the alignment tool 100. Robotics or manual labor may be employed to move and rotate the alignment tool 100 and to index the alignment tool 100 to the circuit board 28.

In order to temporarily affix the pressure sensors 30 to the brackets 102, the alignment tool 100 may include structure to grab and hold the pressure sensors 30. For example, rubber gaskets (not shown) may partially overlap portions of the brackets 102, such that the pressure sensors 30 are grabbed by the rubber gaskets when pressed into the brackets 102.

After the pressure sensors 30 have been properly located relative to the circuit board 28, the pins 32 may be soldered or otherwise attached to the terminals 34. The pressure sensors 30 are now attached to the circuit board 28 and the alignment tool 100 may be removed, leaving the assembled sensor array 14 behind, ready to be installed into the pressure sensing module 15. In embodiments where rubber gaskets are used to hold the pressure sensors 30 to the brackets 102, the rubber gaskets are configured to grasp the pressure sensors 30 with less force than the attachment force of the solder holding the pins 32 to the terminals 34.

Further embodiments of the alignment tool 100 may include other structures for temporarily holding the pressure sensors 30 against the brackets 102 during movement of the alignment tool 100 and also during the soldering stage. The alignment tool may be equipped with clips (not shown) capable of locking the pressure sensors 30 to the brackets 102. Additionally, temporary adhesives may be used to retain the pressure sensors 30. Furthermore, a vacuum may be included on the alignment tool 100 to hold the pressure sensors 30 until the pins 32 have been soldered to the terminals 34.

Soldering the pins 32 to the terminals 34 creates a liquid layer between individual pins 32 and terminals 34 as the solder medium melts. The liquid layer may cause the pressure sensors 30 to float, which may cause the pressure sensors 30 to slide and rotate until the solder cools, resulting in possible misalignment of the pressure sensors 30 relative to the circuit board 28.

Possible misalignment of the pressure sensors 30, due to movement during the soldering process, increases the variance stackups of the pressure sensing module 15 that can be assembled from the sensor array 14. By using the alignment tool 100 to hold the pressure sensors 30 during the soldering process, the pressure sensors 30 may be restrained from floating, and are therefore aligned with increased accuracy relative to the circuit board 28.

The (properly-aligned) sensor array 14 may then be joined to the integrated seal module 10 or another sealing plate to form the pressure sensing module 15. The indexing features on the integrated seal module 10 and the alignment tool 100 are configured to provide highly-accurate alignment of the pressure passages 52 with the pressure ports 53 on the pressure sensors 30 and also with the lines 24 of the manifold 12.

As described above, and referring again to FIGS. 1 and 3, alignment tool 100 may be used with a method of assembling a pressure sensing module. For illustrative purposes, the method is described with reference to the alignment tool 100 and the pressure sensing module 15. However, those having ordinary skill in the art will recognize that the method, as described in the claims, may be executed with other structure.

The method includes affixing a pressure sensor unit to the alignment tool 100. The pressure sensor unit may be similar to the sensor array 14, and may include one or more pressure sensors 30, which are aligned by the alignment tool 100 into a pattern or configuration matching the desired pattern or configuration of the pressure sensors 30 in the pressure sensing module 15. The pressure sensors 30 may be affixed to the alignment tool 100 by temporary adhesives, vacuum devices, gaskets, or other structure configured to temporarily hold the pressure sensors 30 to the brackets 102.

The alignment tool 100 and aligned pressure sensor unit are then moved in tandem to the circuit board 28, where the alignment tool 100 is indexed to the circuit board 28. Indexing may occur through one or more locator features, such as the indexing posts 148, being aligned with one or more receptacle elements on the alignment tool 100, such as the locator holes 146.

After indexing the alignment tool 100 to the circuit board 28—and therefore aligning and locating each of the one or more pressure sensors 30 in the pressure sensor unit to the circuit board 28—the pressure sensor unit is attached to the circuit board 28. The pressure sensors 30 may be attached to the circuit board by soldering the pins 32 to the terminals 34 or by physically capturing the pins 32 such that the pressure sensors 30 communicate with the circuit board 28.

The alignment tool 100 is then removed from the pressure sensor unit, leaving the one or more pressure sensors 30 or the pressure sensor unit solidly affixed to the circuit board 28. A seal plate, such as the integrated seal module 10, is then indexed to the circuit board 28. The seal plate is attached such that the seal plate covers the pressure sensor unit to form a fluid seal between the pressure sensor unit and the seal plate.

The fully-assembled pressure sensing module 15 may then be attached to the manifold 12 or another device having pressure sources to be measured by the pressure sensing module 15. As shown in FIGS. 1 and 3, the method may include attaching a pressure sensor unit which has a pattern or array of at least three pressure sensors 30.

A further method of assembling a pressure sensing module (similar to the pressure sensing module 15 shown in FIG. 1) includes using a modified integrated seal module (not shown) as an alignment tool. In such a method, the modified integrated seal module would include a cradling mounting plate (not shown) having cradles, brackets, or other structure (not shown) configured to grasp the pressure sensors 30. The cradles are configured to index the pressure sensors 30 relative to the pressure passages 52 of the cradling mounting plate.

This additional method uses the modified integrated seal module as the alignment tool by affixing the pressure sensors 30 to the cradles on the cradling mounting plate, and then indexing the modified integrated seal module and pressure sensors 30 to the circuit board 28. In such an embodiment, the modified integrated seal module is configured to withstand the heat of the soldering process, such that the pressure sensors 30 may be soldered to the circuit board 28 while already attached to the modified integrated seal module. This method relieves the assembly process of the need to separately align the pressure sensors 30 to the pressure passages 52, and therefore removes the accompanying variance.

Referring now to FIG. 4, there is shown a partial, cross-sectional view of a further embodiment of an integrated seal module: an overmolded seal module 210, which includes pressure sensors 30 overmolded in the material of a mounting plate 240. In the overmolded seal module 210, the mounting plate 240 is formed in a mold (not shown) in which the pressure sensors 30 have been placed and properly aligned.

Overmolded portions 260 extend from a first face 242 to at least partially encase the pressure sensors 30. The pins 32 however, are not completely overmolded and may still be soldered or otherwise attached to the circuit board 34. Pressure passages 52 formed in the mounting plate 240 directly connect the lines 24 of the manifold 12 with pressure ports 53 on the pressure sensors 30, such that no sealing elements are required between the pressure sensors 30 and the pressure passages 52. Note that in the view shown in FIG. 4, a portion of one of the pressure sensors 30 and overmolded portions 260 has been removed to show one pressure passage 52 and the corresponding pressure port 53.

The overmolded seal module 210 includes a continuous seal member 256, which is liquid injection molded into the mounting plate 240. However, unlike the unitary seal member 56 shown in FIGS. 1 and 2, the continuous seal member 256 of the overmolded embodiment only includes seal elements 254 between the pressure passages 52 and the lines 24 of the manifold 12. The continuous seal member 256 of the overmolded embodiment also includes bushings 250 around locator holes, similar to those shown on the integrated seal module 10 in FIG. 1.

During the assembly process, the pressure sensors 30 and mounting plate 240 are formed together. The continuous seal member 256 may then be liquid injection molded to complete the overmolded seal module 210, with pressure sensors 30 already attached and properly located and aligned relative to the pressure passages 52. The overmolded seal module 210 may then be indexed to the circuit board 28 and the pins 32 soldered to the terminals 34.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. An integrated seal module for sealing one or more pressure ports to one or more pressure sources, comprising:
   a mounting plate having a first surface and a second surface on opposing sides thereof;
   at least one locator hole defined by the mounting plate and extending through the mounting plate between the first and second surfaces;
   a locator bushing disposed within the at least one locator hole;
   at least one pressure passage defined by the mounting plate and extending through the mounting plate between the first and second surfaces; and
   a unitary seal member having at least one opening configured to effect a fluid seal between the one or more pressure ports and the first surface, wherein the seal member and the locator bushing are formed as a single continuous element.

2. The seal module of claim 1, wherein the seal member is a liquid injection molded framework, wherein the liquid injection molded framework includes portions completely encased by the mounting plate.

3. The seal module of claim 2, wherein the one or more pressure ports include six pressure ports and the one or more pressure sources include six pressure sources, and
   wherein the at least one pressure passage includes six pressure passages, each configured to provide fluid communication between a respective one of the six pressure ports and a respective one of the six pressure sources.

4. The seal module of claim 3, further comprising:
   one or more pressure sensors, wherein the one or more pressure ports are located on the one or more pressure sensors, respectively.

5. The seal module of claim 4, wherein the one or more pressure sensors are small outline integrated circuits.

6. The seal module of claim 5, wherein the one or more pressure sensors are overmolded in the mounting plate.

7. The seal module of claim 5, further comprising one or more cradles integrated into the mounting plate, wherein the one or more cradles are configured to engage the one or more pressure sensors.

8. An integrated seal module for sealing one or more pressure ports to one or more pressure sources, comprising:
   a mounting plate having a first surface and a second surface on opposing sides thereof;
   at least one locator hole defined by the mounting plate and extending through the mounting plate between the first and second surfaces;

a locator bushing disposed within the at least one locator hole;

at least one pressure passage defined by the mounting plate and extending through the mounting plate between the first and second surfaces; and a unitary seal member configured to effect a fluid seal between the one or more pressure ports and the first face and configured to effect a fluid seal between the one or more pressure sources and the second surface, wherein the seal member and the locator bushing are formed as a single continuous element.

9. The seal module of claim 8, further comprising:

one or more pressure sensors, wherein the one or more pressure ports are located on the one or more pressure sensors, respectively.

10. The seal module of claim 9, further comprising one or more cradles integrated into the mounting plate, wherein the one or more cradles are configured to engage the one or more pressure sensors.

11. The seal module of claim 10, wherein the one or more pressure sensors are overmolded in the mounting plate.

12. An integrated seal module for sealing at least six pressure ports to at least six pressure sources, comprising:

a mounting plate having a first surface and a second surface on opposing sides thereof;

at least two locator holes defined by the mounting plate and extending through the mounting plate between the first and second surfaces;

at least six pressure passages defined by the mounting plate and extending through the mounting plate between the first and second surfaces;

a seal member formed as a continuous element with at least six openings configured to effect a fluid seal between the at least six pressure ports and the first surface and configured to effect a fluid seal between the at least six pressure sources and the second surface; and at least six pressure sensors overmolded in the mounting plate, wherein the least six pressure ports are located on the at least six pressure sensors, respectively.

13. The seal module of claim 12, further comprising a locator bushing disposed within each of the at least two locator holes.

14. The seal module of claim 13, wherein the unitary seal member and the at two locator bushings are formed as a single continuous unit.

15. The seal module of claim 14, further comprising at least six cradles integrated into the mounting plate, wherein each of the at least six cradles are configured to engage one of the at least six pressure sensors.

16. The seal module of claim 15, wherein the unitary seal member is a liquid injection molded framework, and the liquid injection molded framework includes portions completely encased by the mounting plate.

17. The seal module of claim 16, wherein the at least six pressure sensors are small outline integrated circuits.

* * * * *